(12) United States Patent
Kim et al.

(10) Patent No.: US 12,312,651 B2
(45) Date of Patent: May 27, 2025

(54) ORIENTED ELECTRICAL STEEL SHEET AND MANUFACTURING METHOD THEREFOR

(71) Applicant: POSCO, Gyeongsangbuk-do (CN)

(72) Inventors: Hyun Jong Kim, Pohang-si (KR); Heon-Jo Choi, Pohang-si (KR)

(73) Assignee: POSCO CO., LTD, Pohang-si (KR)

(*) Notice: Subject to any disclaimer, the term of this patent is extended or adjusted under 35 U.S.C. 154(b) by 691 days.

(21) Appl. No.: 17/622,995

(22) PCT Filed: Jun. 26, 2020

(86) PCT No.: PCT/KR2020/008385
§ 371 (c)(1),
(2) Date: Jan. 31, 2022

(87) PCT Pub. No.: WO2020/263026
PCT Pub. Date: Dec. 30, 2020

(65) Prior Publication Data
US 2022/0228232 A1 Jul. 21, 2022

(30) Foreign Application Priority Data
Jun. 26, 2019 (KR) .................. 10-2019-0076503

(51) Int. Cl.
*C21D 9/46* (2006.01)
*C21D 6/00* (2006.01)
(Continued)

(52) U.S. Cl.
CPC .............. *C21D 9/46* (2013.01); *C21D 6/005* (2013.01); *C21D 6/008* (2013.01); *C21D 8/1222* (2013.01);
(Continued)

(58) Field of Classification Search
CPC .......... C21D 9/46; C21D 6/005; C21D 6/008; C21D 8/1222; C21D 8/1233;
(Continued)

(56) References Cited

U.S. PATENT DOCUMENTS

| 4,897,131 A | 1/1990 | Wada et al. |
| 5,342,454 A | 8/1994 | Hayakawa et al. |

(Continued)

FOREIGN PATENT DOCUMENTS

| CN | 1400319 A | 3/2003 |
| CN | 1850430 A | 10/2006 |

(Continued)

OTHER PUBLICATIONS

Extended European Search Report dated Sep. 29, 2022, issued in corresponding European Patent Application No. 201911014513.7.
(Continued)

*Primary Examiner* — Anthony M Liang
*Assistant Examiner* — Danny N Kang
(74) *Attorney, Agent, or Firm* — Morgan Lewis & Bockius LLP

(57) ABSTRACT

Provided is a manufacturing method of a grain-oriented electrical steel sheet including preparing a hot-rolled sheet by hot-rolling a slab; removing some of scales formed on the hot-rolled sheet and leaving a scale layer having a thickness of 10 nm or more to prepare a hot-rolled sheet on which the scale layer remains; preparing a cold-rolled sheet by cold-rolling the hot-rolled sheet on which the scale layer remains; preparing the decarburization annealed cold-rolled sheet by decarburization annealing the cold-rolled sheet; coating an annealing separator on the decarburization annealed cold-rolled sheet to form a metal oxide layer; and final annealing the steel sheet on which the metal oxide layer is formed, (Continued)

wherein the annealing separator includes magnesium oxide (MgO) or magnesium hydroxide (MgOH) and fluoride.

5 Claims, 9 Drawing Sheets

(51) Int. Cl.
| | |
|---|---|
| *C21D 8/12* | (2006.01) |
| *C22C 38/00* | (2006.01) |
| *C22C 38/02* | (2006.01) |
| *C22C 38/04* | (2006.01) |
| *C22C 38/06* | (2006.01) |
| *H01F 1/147* | (2006.01) |

(52) U.S. Cl.
CPC ......... *C21D 8/1233* (2013.01); *C21D 8/1261* (2013.01); *C21D 8/1272* (2013.01); *C21D 8/1283* (2013.01); *C22C 38/001* (2013.01); *C22C 38/002* (2013.01); *C22C 38/02* (2013.01); *C22C 38/04* (2013.01); *C22C 38/06* (2013.01); *H01F 1/147* (2013.01); *C21D 2201/05* (2013.01); *C22C 2202/02* (2013.01)

(58) Field of Classification Search
CPC .. C21D 8/1261; C21D 8/1272; C21D 8/1283; C21D 2201/05; C21D 7/06; C21D 8/1244; C21D 8/1255; C21D 8/1277; C21D 8/1216; C22C 38/001; C22C 38/002; C22C 38/02; C22C 38/04; C22C 38/06; C22C 2202/02; H01F 1/147; Y02P 10/20; B24C 1/086; C23C 4/10; C23C 4/134; C23C 8/02; C23C 8/10; C23C 8/26; C23C 8/80; C23C 24/04

See application file for complete search history.

(56) References Cited

U.S. PATENT DOCUMENTS

| | | | |
|---|---|---|---|
| 5,840,131 | A | 11/1998 | Yakashiro et al. |
| 7,727,644 | B2 | 6/2010 | Watanabe et al. |
| 2019/0247902 | A1* | 8/2019 | Ehashi .................. C22C 38/002 |

FOREIGN PATENT DOCUMENTS

| | | | | |
|---|---|---|---|---|
| CN | 108474055 | A | | 8/2018 |
| CN | 109628717 | A | | 4/2019 |
| EP | 0 528 419 | A1 | | 2/1993 |
| EP | 3 889 286 | A2 | | 10/2021 |
| JP | S59-41480 | A | | 3/1984 |
| JP | 08143975 | A | * | 6/1996 ............... C21D 1/70 |
| JP | H08-143975 | A | | 6/1996 |
| JP | H09-49028 | A | | 2/1997 |
| JP | H09-291313 | A | | 11/1997 |
| JP | H11-269555 | A | | 10/1999 |
| JP | 2005-281737 | A | | 10/2005 |
| JP | 2018-021241 | A | | 2/2018 |
| JP | 2018-066036 | A | | 4/2018 |
| KR | 10-1992-0009999 | A | | 6/1992 |
| KR | 10-0762436 | B1 | | 10/2007 |
| KR | 10-2014-0060718 | A | | 5/2014 |
| KR | 10-1751526 | B1 | | 6/2017 |
| WO | 2020/111740 | A2 | | 6/2020 |

OTHER PUBLICATIONS

Japanese Office Action dated Feb. 28, 2023 issued in Japanese Patent Application No. 2021-577696.
Chinese Office Action dated Aug. 10, 2023 issued in Chinese Patent Application No. 202080059937.X.
Chinese Search Report dated Aug. 4, 2023 issued in Chinese Patent Application No. 202080059937.X.

* cited by examiner

ORIENTED ELECTRICAL STEEL SHEET AND MANUFACTURING METHOD THEREFOR

CROSS-REFERENCE OF RELATED APPLICATIONS

This application is the U.S. National Phase under 35 U.S.C. § 371 of International Patent Application No. PCT/KR2020/008385, filed on Jun. 26, 2020 which claims priority to and the benefit of Korean Application No. 10-2019-0016503 filed on Jun. 26, 2019, the entire contents of which are incorporated herein by reference.

TECHNICAL FIELD

A present invention relates to a grain-oriented electrical steel sheet and a manufacturing method thereof. More specifically, the present invention relates to a grain-oriented electrical steel sheet and a manufacturing method thereof capable of leaving some of scales existing on the surface of a hot-rolled sheet after manufacturing the hot-rolled sheet and forming an oxide film.

BACKGROUND ART

An electrical steel sheet is a product used as a material for transformers, motors, and electronic devices and a functional product that emphasizes electrical properties, unlike general carbon steel that emphasizes workability such as mechanical properties. Required electrical properties include low iron loss, and high magnetic flux density, magnetic permeability and space factor.

The electrical steel sheet is classified into a grain-oriented electrical steel sheet and a non-oriented electrical steel sheet again. The grain-oriented electrical steel sheet is an electrical steel sheet with excellent magnetic properties in a rolling direction by forming a Goss texture ({110}<001> texture) throughout the steel sheet by using an abnormal grain growth phenomenon called secondary recrystallization. The non-oriented electrical steel sheet is an electrical steel sheet with uniform magnetic properties in all directions on the rolled sheet.

As a production process of the non-oriented electrical steel sheet, after a slab is manufactured, an insulation coating layer is formed through hot rolling, cold rolling and final annealing.

As a production process of the grain-oriented electrical steel sheet, after manufacturing a slab, an insulation coating layer is formed through hot rolling, preliminary annealing, cold rolling, decarburization annealing, and final annealing.

In the production process of the grain-oriented electrical steel sheet, there is a process that improves the efficiency of a subsequent process by removing a surface scale generated in a hot rolling process between the preliminary annealing process and the cold rolling process, which is called a pickling process.

However, a large amount of Fe is present on the surface of the steel sheet after pickling, and the binding force with functional groups O and OH does not act greatly on the surface of the steel sheet. When an insulation coating layer containing oxide consisting of components O and OH is formed on such a surface, there are problems in that the insulation coating layer is not formed uniformly and the adhesion between the steel sheet and the insulation coating layer is deteriorated.

DISCLOSURE

Technical Problem

The present invention has been made in an effort to provide a grain-oriented electrical steel sheet and a manufacturing method thereof. More specifically, the present invention has been made in an effort to provide a grain-oriented electrical steel sheet and a manufacturing method thereof having advantages of leaving some of scales existing on the surface of a hot-rolled sheet after manufacturing the hot-rolled sheet and forming an oxide film.

Technical Solution

An exemplary embodiment of the present invention provides a grain-oriented electrical steel sheet including a grain-oriented electrical steel sheet substrate; a scale layer positioned on the grain-oriented electrical steel sheet substrate; and a metal oxide layer positioned on the scale layer, wherein the metal oxide layer includes a forsterite compound, and the F content of the metal oxide layer is 0.1 to 3 wt %.

The metal oxide layer may include a first phase including a forsterite compound and second phase consisting of Si, and the first phase may be included in more than 5 area % and less than 95 area % with respect to 100 area % of the metal oxide layer, and the second phase may be included in more than 3 area % and less than 20 area % with respect to 100 area % of the metal oxide layer.

The grain-oriented electrical steel sheet may further include an insulation coating layer positioned on the metal oxide layer.

The metal oxide layer may include magnesium oxide (MgO) of 1.0 wt % or less. Specifically, the magnesium oxide (MgO) may be included in 0.5 to 0.9 wt %.

The scale layer may include Si of 1 to 80 wt % and O of 1 to 80 wt % by wt %, and Fe and inevitable impurities on the balance.

Another exemplary embodiment of the present invention provides a manufacturing method of a grain-oriented electrical steel sheet including preparing a hot-rolled sheet by hot-rolling a slab; removing some of scales formed on the hot-rolled sheet and leaving a scale layer having a thickness of 10 nm or more to prepare a hot-rolled sheet on which the scale layer remains; preparing a cold-rolled sheet by cold-rolling the hot-rolled sheet on which the scale layer remains; preparing the primary recrystallization annealed cold-rolled sheet by annealing the cold-rolled sheet through primary recrystallization; coating an annealing separator on the annealed cold-rolled sheet through primary recrystallization; and annealing the cold-rolled sheet coated with the annealing separator through secondary recrystallization, wherein the annealing separator includes magnesium oxide (MgO) or magnesium hydroxide (MgOH) and fluoride.

The fluoride may be included in 0.5 to 2 parts by weight with respect to 100 parts by weight of the magnesium oxide and the magnesium hydroxide. The fluoride may be included in particularly 0.1 to 2 parts by weight, more particularly 0.5 to 1.5 parts by weight.

The fluoride may include at least one kind of ammonium fluoride ($NH_4F$), $CaF_2$, NaF and $MgF_2$.

The slab may include Si: 1.0 to 4.0%, C: 0.03 to 0.09 wt %, Al: 0.015 to 0.040%, Mn: 0.04 to 0.15%, N: 0.001 to 0.005%, S: 0.01% or less (excluding 0%) by wt %, and include Fe and other inevitable impurities on the balance.

The leaving of the scale layer may be a step of blast-treating the hot-rolled sheet at a rotation speed of 300 to 2500 rpm, an amount of particles included of 300 to 800 kg/min, the size of the particle of 0.1 to 0.8 cm, and the moving speed of the substrate of 20 to 60 mpm.

The leaving of the scale layer may further include controlling surface roughness of the hot-rolled sheet on which the scale layer remains.

In the controlling of the surface roughness of the hot-rolled sheet, the roughness may be controlled to 1.0 to 2.5. The roughness may be specifically 1.3 to 2.4, more specifically 2.0 to 2.3.

The controlling of the surface roughness may include passing the hot-rolled sheet on which the scale layer remains between blades coated with rubber.

The elasticity of the rubber may be 1 to 5.

The manufacturing method of the grain-oriented electrical steel sheet may further include pickling after the leaving of the scale layer.

The pickling may include immersing the hot-rolled sheet in an acid solution of 5 to 18 wt % for 20 to 140 seconds.

After the cold rolling, the thickness of the scale layer may be 5 to 100 nm.

The primary recrystallization annealing temperature may be 600 to 950° C.

The coating amount of the annealing separator may be 1 to 20 g/m$^2$.

In the secondary recrystallization annealing, a first heating period temperature may be 650 to 850° C., a second heating period temperature may be 850 to 1250° C., and each heating rate may be 15° C./hr.

The manufacturing method of the grain-oriented electrical steel sheet may further include forming an insulation coating layer.

According to an embodiment of the present invention, it is possible to provide a grain-oriented electrical steel sheet comprising an inner scale layer and a metal oxide layer.

In addition, according to an exemplary embodiment of the present invention, the grain-oriented electrical steel sheet including the metal oxide layer may be prevented from fusion when winding on a coil.

In addition, according to the exemplary embodiment of the present invention, the metal oxide layer may exhibit an effect of reducing iron loss by providing tension due to a difference in thermal expansion with the steel sheet.

In addition, according to the exemplary embodiment of the present invention, the grain-oriented electrical steel sheet including the metal oxide layer may have insulating properties.

In addition, according to the exemplary embodiment of the present invention, it is possible to uniformly form a metal oxide layer including a forsterite ($Mg_2SiO_4$) compound on the inner scale layer.

In addition, according to the exemplary embodiment of the present invention, it is possible to uniformly form an insulation coating layer on the metal oxide layer.

MODE FOR INVENTION

Terms such as first, second and third are used to describe various parts, components, regions, layers and/or sections, but are not limited thereto. These terms are used only to distinguish one part, component, region, layer or section from the other part, component, region, layer or section. Accordingly, a first part, component, region, layer or section to be described below may be referred to as a second part, component, region, layer or section without departing from the scope of the present invention.

The terms used herein is for the purpose of describing specific exemplary embodiments only and are not intended to be limiting of the present invention. The singular forms used herein include plural forms as well unless the phrases clearly have the opposite meaning. The "comprising" used in the specification means that a specific feature, region, integer, step, operation, element and/or component is embodied and the presence or addition of other specific features, regions, integers, steps, operations, elements, and/or components are not excluded.

When a part is referred to as being "above" or "on" the other part, the part may be directly above or on the other part, or another part may be interposed therebetween. In contrast, when a part is referred to as being "directly above" the other part, another part is not interposed therebetween.

In addition, unless otherwise specified, % means wt %, and 1 ppm is 0.0001 wt %.

In an exemplary embodiment of the present invention, the meaning of further comprising an additional element means replacing and comprising iron (Fe) on the balance by an added amount of the additional element.

Unless defined otherwise, all terms including technical and scientific terms used herein have the same meaning as commonly understood by those skilled in the art to which the present invention belongs. Commonly used predefined terms are further interpreted as having a meaning consistent with the relevant technical literature and the present disclosure, and are not to be construed as ideal or very formal meanings unless defined otherwise.

Hereinafter, an exemplary embodiment of the present invention will be described in detail so as to be easily implemented by those skilled in the art. As those skilled in the art would realize, the described embodiments may be modified in various different ways, all without departing from the spirit or scope of the present invention.

In addition, a scale layer 20 of the present disclosure refers to a scale layer generated in a process of manufacturing an electrical steel sheet. For example, the scale layer 20 of the present disclosure may refer to a scale layer generated in a hot rolling step in the process of manufacturing the electrical steel sheet.

Figure 1:
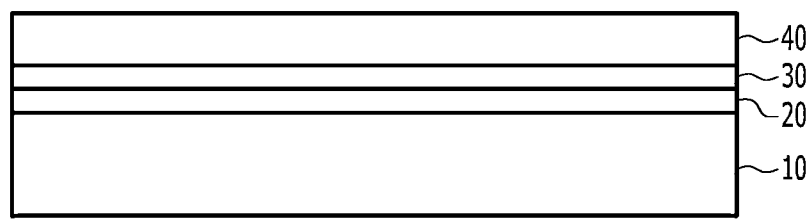
FIG. 1 is a diagram illustrating a three-layer electrical steel sheet including a metal oxide layer and an insulation coating thereon in an exemplary embodiment of the present invention.

FIG. 1 schematically illustrates a cross section of a grain-oriented electrical steel sheet 100 according to an exemplary embodiment of the present invention. Referring to FIG. 1, a structure of the grain-oriented electrical steel sheet according to an exemplary embodiment of the present invention will be described. The grain-oriented electrical steel sheet of FIG. 1 is only to exemplify the present invention, and the present invention is not limited thereto. Accordingly, the structure of the grain-oriented electrical steel sheet may be variously modified.

As illustrated in FIG. 1, the grain-oriented electrical steel sheet 100 according to the exemplary embodiment of the present invention includes a scale layer 20 existing in an inner direction from the surface of a grain-oriented electrical steel sheet substrate 10. As such, the scale layer 20 is included to form a strong bond between a metal oxide layer 30 and the scale layer 20, thereby improving the adhesion with the metal oxide layer 30. In addition, the scale layer 20 itself has an insulating property to improve the insulating property. The metal oxide layer 30 includes a forsterite compound, and the metal oxide layer may have an F content of 0.1 to 3 wt %.

Hereinafter, each component will be described in detail.

First, the grain-oriented electrical steel sheet substrate 10 may use all alloy components used in the grain-oriented electrical steel sheet. As an example, the grain-oriented electrical steel sheet substrate 10 may include Si: 1.0 to 4.0%, C: 0.03 to 0.09 wt %, Al: 0.015 to 0.040%, Mn: 0.04 to 0.15%, N: 0.001 to 0.005%, S: 0.01 wt % or less (excluding 0%) by wt % and may include Fe and other inevitable impurities on the balance.

The scale layer 20 exists in an inner direction from the surface of the grain-oriented electrical steel sheet substrate 10. The thickness of the scale layer 20 may be 5 to 100 nm. More specifically, the thickness may be 5 to 20 nm. If the scale layer 20 is too thin, it is difficult to obtain the effect of improving adhesion and insulating properties with the metal oxide layer 30 generated by the presence of the scale layer 20 described above. In addition, if the scale layer 20 is too thick, it is possible to rather have a bad effect on the magnetism.

The scale layer 20 may include Si: 1 to 80 wt %, O: 1 to 80 wt %, and Fe and inevitable impurities on the balance. More specifically, the scale layer 20 may include Si: 5 to 40 wt %, O: 5 to 40 wt %, and Fe and inevitable impurities on the balance.

The scale layer 20 has a smaller Fe content than the grain-grain-oriented electrical steel sheet substrate 10, but has a relatively high Si content, so that the binding force with the components OH and O acts greatly. Accordingly, when the metal oxide layer 30 is formed, the metal oxide layer 30 is uniformly formed and the adhesion is improved. In addition, the scale layer 20 has an O component content higher than that of the grain-oriented electrical steel sheet substrate 10 to provide an insulating property by itself.

In FIG. 1, the surface of the scale layer 20 (i.e., an interface between the scale layer 20 and the metal oxide layer 30) is flatly expressed, but very substantially roughly formed. The scale layer 20 may have roughness of 1.0 to 2.5. The roughness may be specifically 1.3 to 2.4, more specifically 2.0 to 2.3. When the roughness is too high, it is possible to have a bad effect on the magnetism. On the other hand, when the roughness is controlled to be too low, a problem in which the scale layer 20 is fully removed may occur. Accordingly, the roughness of the scale layer 20 may be controlled in the aforementioned range.

The metal oxide layer 30 of FIG. 1 may include 0.1 to 3 wt % of F. F is derived from fluoride contained in an annealing separator, and this fluoride serves to uniformly form the metal oxide layer 30 by suppressing the generation of an intermediate product during a forsterite compound formation reaction. When F is included too small, there is a possibility that the reaction may not occur, and when F is included too large, the surface coating may be uneven due to excessive solidification. More specifically, F may be included in 0.1 to 1 wt %. At this time, F may be measured by a GC-mass spectroscopy method.

The metal oxide layer 30 of FIG. 1 includes a first phase containing a forsterite compound and a second phase containing Si, and the first phase is included in more than 5 area % and less than 95 area % with respect to 100 area % of the metal oxide layer 30, and the second phase may be included in more than 3 area % and less than 20 area % with respect to 100 area % of the metal oxide layer 30.

The metal oxide layer 30 of FIG. 1 may include magnesium oxide (MgO) or magnesium hydroxide (MgOH) in an amount of 1.0 wt % or less. More specifically, the magnesium oxide (MgO) or magnesium hydroxide (MgOH) may be included in the range of 0.5 to 0.9 wt %. In the metal oxide layer 30, it is advantageous in terms of the uniformity of the surface component to include as little as possible magnesium oxide that has not reacted with the forsterite compound. As described above, unreacted magnesium oxide in the metal oxide layer 30 may be greatly reduced by including an appropriate amount of fluoride in the annealing separator.

Figure 2:
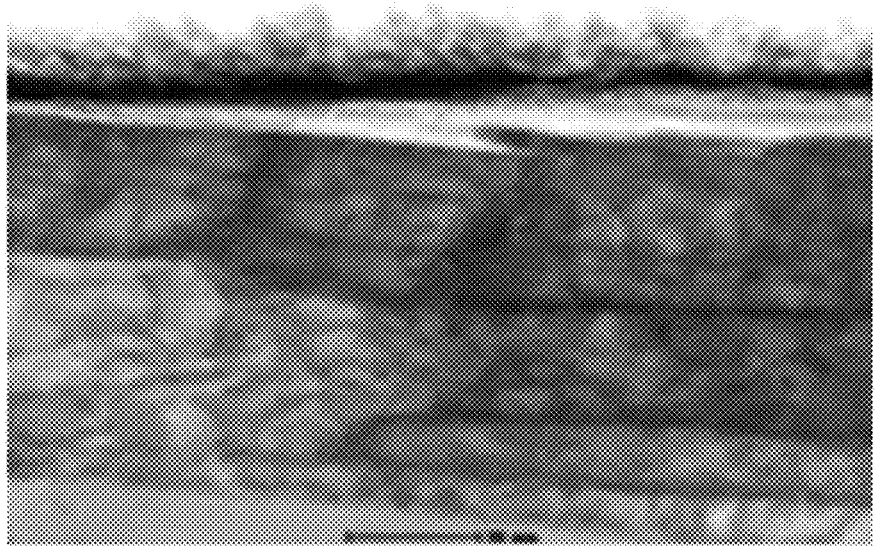
FIG. 2 is a scanning electron microscopy (SEM) photograph of a cross section of the steel sheet after pickling in an exemplary embodiment of the present invention.

As illustrated in FIGS. 1 and 2, an insulation coating layer 40 may be further formed on the metal oxide layer 30. In an exemplary embodiment of the present invention, since the metal oxide layer 30 is appropriately formed, it is possible to improve the adhesion with the insulation coating layer 40, and even if the thickness of the insulation coating layer 40 is formed thinner, it is possible to ensure a sufficient insulation property. Specifically, the thickness of the insulation coating layer 40 may be 3 to 5 µm.

A manufacturing method of the grain-oriented electrical steel sheet according to an exemplary embodiment of the present invention includes preparing a hot-rolled sheet by hot-rolling a slab; removing some of scales formed on the hot-rolled sheet and leaving a scale layer having a thickness of 10 nm or more to prepare a hot-rolled sheet on which the scale layer remains; preparing a cold-rolled sheet by cold-rolling the hot-rolled sheet on which the scale layer remains; preparing the primary recrystallization annealed cold-rolled sheet by annealing the cold-rolled sheet through primary recrystallization; coating an annealing separator on the annealed cold-rolled sheet through primary recrystallization; and annealing the cold-rolled sheet coated with the annealing separator through secondary recrystallization, wherein the annealing separator includes magnesium oxide (MgO) or magnesium hydroxide (MgOH) and fluoride.

The fluoride may be included in 0.5 to 2 parts by weight with respect to 100 parts by weight of the magnesium oxide and the magnesium hydroxide. The fluoride may be included in specifically 0.1 to 2 parts by weight, more specifically 0.5 to 1.5 parts by weight.

The fluoride may include at least one kind of ammonium fluoride ($NH_4F$), $CaF_2$, NaF and $MgF_2$.

Hereinafter, each step will be described in detail.

First, the alloy component of the slab is not particularly limited, and any alloy component to be used in the electrical steel sheet may be used. In one example, the slab may include Si: 1.0 to 4.0%, C: 0.03 to 0.09 wt %, Al: 0.015 to 0.040%, Mn: 0.04 to 0.15%, N: 0.001 to 0.005%, S: 0.01% or less (excluding 0%) by wt %, and may include Fe and other inevitable impurities on the balance.

First, the slab is heated. The heating temperature of the slab is not limited, but when the slab is heated at a temperature of 1300° C. or less, a columnar structure of the slab is prevented from coarsely growing, thereby preventing the occurrence of cracks in the sheet during the hot rolling process. Accordingly, the heating temperature of the slab may be 1050 to 1300° C.

Next, the slab is hot-rolled to manufacture the hot-rolled sheet. The hot rolling temperature is not limited, and as an example, the hot rolling may be terminated at 950° C. or less.

Next, some of scales formed on the hot-rolled sheet are removed to leave scales having a thickness of 10 nm or more. The thickness may be specifically 10 to 300 nm, more specifically 30 nm to 150 nm.

Since the hot rolling is performed at a high temperature, the scales are inevitably formed on the surface of the hot-rolled sheet. Since these scales adversely affect magnetism and may cause slip during rolling, it was common to remove fully the scales.

In the exemplary embodiment of the present invention, by intentionally leaving the scale layer at a thickness of 10 nm or more, adhesion with the metal oxide layer was improved, and additional insulating properties may be obtained. The scale has a smaller Fe content than the steel sheet substance, but has a relatively high Si content, so that the binding force with the components OH and O acts greatly. Like a general method, when all the scales are removed, only Fe is present on the surface. Since Fe has very low affinity with magnesium oxide or magnesium hydroxide as an annealing separator, magnesium oxide or magnesium hydroxide is not effectively coated on the Fe surface. However, Si has a high binding force with O to have very high affinity with magnesium oxide or magnesium hydroxide. Accordingly, since $SiO_2$ is included in an internal scale, magnesium oxide or magnesium hydroxide may be effectively coated when the internal scale remains.

In addition, the scale itself has an O component content that is higher than that of the steel sheet substrate to provide insulating properties by itself.

In addition, after the scale layer of the hot-rolled sheet is left, the scale layer remaining on the surface may consist of two or more phases. The first phase may include $SiO_2$, and the second phase may include at least one kind of oxide of metal selected from Al, Ti, Cu, Cr, Ni, Ca, Zn, Na, K, Mo, In, Sb, Ba, Bi, or Mn.

The method of leaving the scales is not particularly limited. For example, the scales may be treated using a blast method in which the rotation speed is 300 to 2500 rpm, the amount of particles included is 300 to 800 kg/min, the size of the particle ball is 0.1 to 0.8 cm, and the moving speed of the substrate is 20 to 60 mpm. The blast method is a method of removing scales by colliding fine particles with the steel sheet at a high speed. At this time, the speed of the fine particles may be 0.5 to 200 km/s.

This is a condition in which the amount of particles is small compared to the blast method in which all the scales are removed. As such, the scales may be left at an appropriate thickness by the blasting method described above. If the thickness is larger or smaller than the above-mentioned range, it is impossible to leave the scales at an appropriate thickness, such as removing all of the scales.

In the exemplary embodiment of the present invention, the thickness of the scales remaining on the hot-rolled sheet is 10 nm or more. The thickness of the scales may be non-uniform over the entire steel sheet, and unless otherwise specified, the thickness of the scales means an average thickness over the entire surface of the steel sheet. If the scale thickness remains too thick, it may adversely affect the magnetism. Accordingly, the thickness of the remaining scales may be 10 to 300 nm. More specifically, the thickness of the remaining scales may be 30 to 150 nm.

Next, the roughness of the hot-rolled sheet in which the scales remain is controlled. At this time, the roughness means the roughness of the coarse outermost surface of the hot-rolled sheet, that is, the roughness of the scales. When the scales remain, the roughness becomes very large. This adversely affects the magnetism. Therefore, it is necessary to control only the roughness without removing the scales.

In an exemplary embodiment of the present invention, the roughness of the hot-rolled sheet may be controlled to 1.0 to 2.5 through a step of controlling the roughness. The roughness may be specifically 1.3 to 2.4, more specifically 2.0 to 2.3. If the roughness is too high, it may adversely affect the magnetism. On the other hand, if the roughness is controlled too low, a problem in which all the scales are removed may occur. Accordingly, it is possible to control the roughness within the above-described range.

As a method of controlling the roughness, a step of passing the hot-rolled sheet between blades coated with rubber may be included.

At this time, the elasticity of the rubber may be 1 to 5. The elasticity of the rubber may be particularly 1 to 3, more particularly 1 to 2. When the elasticity is out of the range, it may be difficult to control the roughness to a desired range.

After the step of controlling the roughness of the hot-rolled sheet, a pickling step may be further included. The roughness of the hot-rolled sheet may be further controlled through pickling. During pickling, if the concentration of an acid solution is high or an immersion time is long, a problem in which all the scales are removed may occur. Accordingly, the hot-rolled sheet may be immersed for 20 to 120 seconds in 16 wt % or less of the acid solution at a temperature of 65 to 76° C.

Next, the hot-rolled sheet is cold-rolled to manufacture a cold-rolled sheet. A reduction ratio may be applied differently depending on the thickness of the hot-rolled sheet, but may be applied with 70 to 95% and then the cold rolling may be performed so that the final thickness is 0.2 to 0.65 mm. The cold rolling may be performed once, or two or more times with intermediate annealing therebetween as needed.

In the cold rolling process, the scale layer is also rolled to decrease the thickness. After the cold rolling, the thickness of the scale layer may be 5 to 100 nm. More specifically, the thickness of the scale layer may be 2 to 20 nm.

Next, the cold-rolled sheet after cold rolling is subjected to primary recrystallization annealing. In the primary recrystallization annealing step, the primary recrystallization occurs in which Goss grain nuclei are generated. In the primary recrystallization annealing process, decarburization and nitridation of the steel sheet may be performed. For decarburization and nitridation, the primary recrystallization annealing may be performed under a mixed gas atmosphere of steam, hydrogen and ammonia.

For nitridation, when nitride such as (Al, Si, Mn)N and AlN, which is a main precipitate, is formed by introducing nitrogen ions into the steel sheet using ammonia gas, there is any method of performing decarburization and then nitridation, or decarburization and nitridation at the same time, or nitridation and then decarburization, but there is no problem to exhibit the effect of the present invention.

The primary recrystallization annealing may be performed in a temperature range of 600 to 950° C. Specifically, the primary recrystallization annealing may be performed in a temperature range of 750 to 870° C.

In the primary recrystallization annealing step, Si in scales with high oxygen affinity reacts with oxygen to form $SiO_2$. In addition, as oxygen gradually penetrates into the steel sheet in the primary recrystallization annealing step, Fe-based oxide ($Fe_2SiO_4$) or the like is also formed. That is, after the primary recrystallization annealing step, an oxide film including $SiO_2$ and Fe-based oxide is formed on the surface of the steel sheet.

Next, the secondary recrystallization annealing is performed on the cold-rolled sheet on which the primary recrystallization annealing has been completed. At this time, after the annealing separator is applied to the cold-rolled sheet on which the primary recrystallization annealing has been completed, the secondary recrystallization annealing may be performed. In this case, the annealing separator is not particularly limited, and an annealing separator containing magnesium oxide or magnesium hydroxide as a main component and further containing fluoride may be used. The fluoride may be selected from the group consisting of ammonium fluoride ($NH_4F$), $CaF_2$, NaF and $MgF_2$.

In the secondary recrystallization annealing step, the oxide film including $SiO_2$ and Fe-based oxide formed in the primary recrystallization annealing step reacts with magnesium oxide or magnesium hydroxide as the annealing separator. This reaction may be represented by the following Chemical Formula 1 or Chemical Formula 2 to form a forsterite compound in the metal oxide layer. The forsterite compound may help to stably cause secondary recrystallization during a high-temperature annealing process. Hereinafter, a case where fluoride is ammonium fluoride will be described as an example.

$2Mg(OH)_2 + SiO_2 \rightarrow Mg_2SiO_4(forsterite) + 2H_2O$ [Chemical Formula 1]

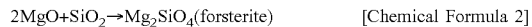
$2MgO + SiO_2 \rightarrow Mg_2SiO_4(forsterite)$ [Chemical Formula 2]

Ammonium fluoride, as fluoride that may be further included in the annealing separator, prevents intermediate products such as $MgSiO_3$, $Mg_3Si_4O_{10}(OH)_2$, etc. through the reactions of Chemical Formulas 3 and 4 below, and allows all materials of the layer to be formed as forsterite ($Mg_2SiO_4$) which is a uniform material.

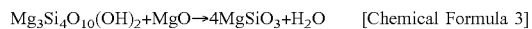
$Mg_3Si_4O_{10}(OH)_2 + MgO \rightarrow 4MgSiO_3 + H_2O$ [Chemical Formula 3]

$MgO + MgSiO_3 \rightarrow Mg_2SiO_4$ [Chemical Formula 4]

In the annealing separator, ammonium fluoride may be included in an amount of 0.5 to 2 parts by weight based on 100 parts by weight of magnesium oxide and magnesium hydroxide. Specifically, ammonium fluoride may be included in an amount of 0.1 to 2 parts by weight, more specifically 0.5 to 1.5 parts by weight, based on 100 parts by weight of magnesium oxide and magnesium hydroxide. The annealing separator is in a slurry state, and may include 400 to 1500 parts by weight of water based on 100 parts by weight of magnesium oxide and magnesium hydroxide.

The coating amount of the annealing separator may be 1 to 20 g/m². More specifically, the coating amount may be 1 to 15 g/m². If the coating amount of the annealing separator is too small, the metal oxide layer may not be formed smoothly. On the other hand, if the coating amount of the annealing separator is too large, the secondary recrystallization may be adversely affected.

Next, the steel sheet coated with the annealing separator is subjected to secondary recrystallization annealing. The purpose of the secondary recrystallization annealing is broadly to form a {110}<001> texture by secondary recrystallization, provide an insulating property by forming a metal oxide layer containing a forsterite compound by the reaction between an oxide layer formed during decarburization and magnesium oxide or magnesium hydroxide, and remove impurities that impair magnetic properties.

During the secondary recrystallization annealing, the temperature of a first heating period may be 650 to 850° C., and the temperature of a second heating period may be 850 to 1250° C. A heating rate in the heating period may be 15° C./hr. In addition, in the first heating period, the secondary recrystallization is well developed by maintaining a mixed gas of 20 to 30 vol % of nitrogen and 70 to 80 vol % of hydrogen to protect nitride, which is a particle growth inhibitor, and maintained in a 100 vol % hydrogen atmosphere for 15 hours after completing the second heating and then cooled in a furnace to remove impurities.

Thereafter, the method may further include forming an insulation coating layer on the metal oxide layer. As a method of forming insulation, a ceramic layer may be formed by spraying ceramic powder, a solution, or a sol on the film. Specifically, methods of plasma spray coating, high velocity oxy fuel, aerosol deposition, and cold spray may be applied.

A method of forming a ceramic layer by coating a ceramic layer-forming composition including a metal phosphate to a ceramic sol and a solution may be used.

After the ceramic layer is formed, magnetic domains refinement may be performed if necessary.

Hereinafter, the present invention will be described in more detail through Examples. However, these Examples are only to exemplify the present invention, and the present invention is not limited thereto.

Experimental Example 1—Comparison According to Remaining Scale Layer

Example 1—when Scale Layer Remains

A slab containing 3.4 wt % of silicon (Si) and consisting of Fe and other inevitable impurities on the balance was prepared.

A hot-rolled sheet was prepared by hot-rolling the slab at a thickness of 2.3 mm.

The hot-rolled sheet was treated using a shot blaster at a steel sheet moving speed of 30 mpm, a particle usage amount of 700 kg/min, a particle ball size of 0.6 cm, and a rotation speed of 2250 rpm to leave a scale layer at a thickness of about 50 nm. Thereafter, the surface roughness was controlled to about 2.0 to 2.3 by passing the hot-rolled sheet between blades coated with rubber having elasticity of about 1 to 2. Then, the hot-rolled sheet was immersed and pickled for about 120 seconds in a hydrochloric acid solution (concentration of about 16 wt %) at a temperature of about 72° C. Thereafter, washing was performed.

FIG. 2 illustrates a scanning electron microscope (SEM) photograph of a cross section of the steel sheet after pickling. As illustrated in FIG. 2, the scale layer was indicated as a white part, and it may be confirmed that the scale layer remained.

Figure 4:
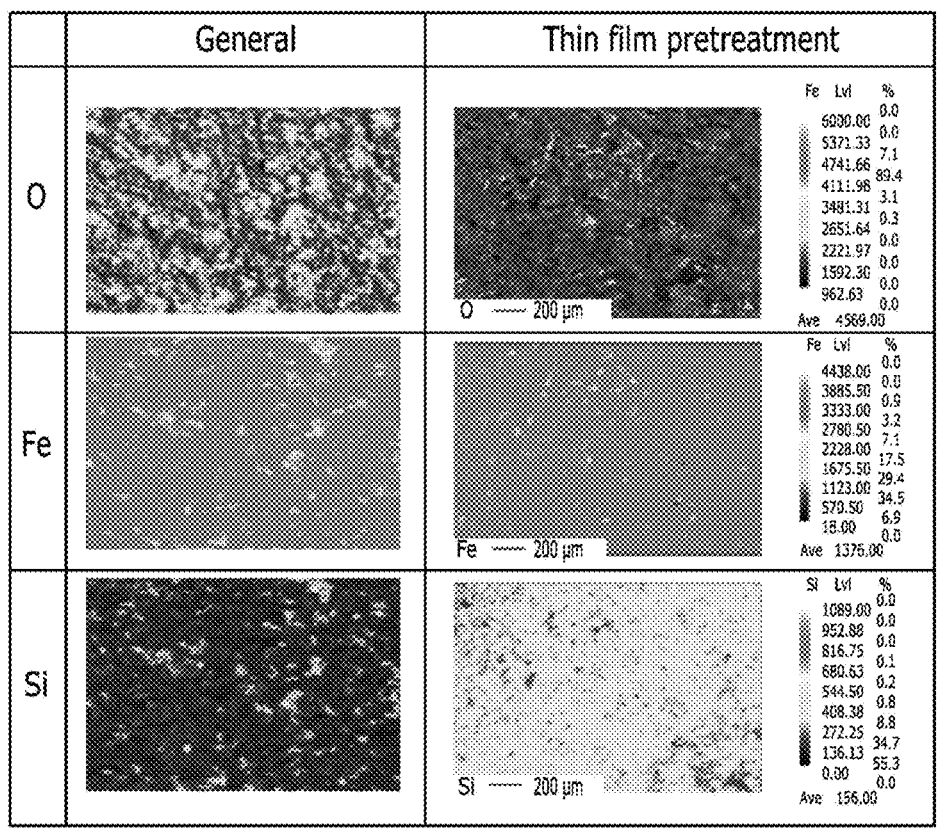
FIG. 4 is a result of measuring a surface of a hot-rolled sheet after pickling of the present invention by EPMA. Wherein, the left side illustrates Comparative Example of the present invention, and the right side illustrates an exemplary embodiment of the present invention.

As a result of measuring the surface of the pickled hot-rolled sheet with EPMA, it may be confirmed that the Si content is present in a large amount (thin film pretreatment in FIG. 4).

Then, the hot-rolled sheet was cold-rolled to have a sheet thickness of 0.23 mm. A cross section of the cold-rolled sheet after cold rolling was illustrated in FIG. 5.

Figure 5:
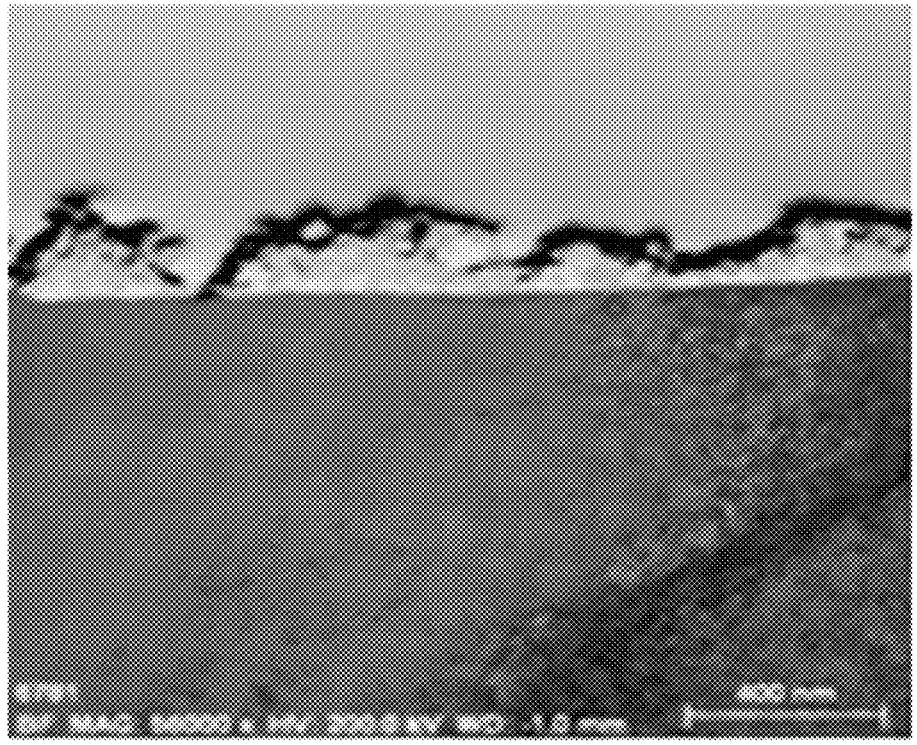
FIG. 5 is a SEM photograph of the surface of the steel sheet after annealing a cold-rolled sheet in an exemplary embodiment of the present invention.

As illustrated in FIG. 5, it was confirmed that the scale layer remained at 15 to 20 nm even after cold rolling.

Comparative Example 1—Complete Removal of Scales

A slab containing 3.4 wt % of silicon (Si) and consisting of Fe and other inevitable impurities on the balance was prepared.

A hot-rolled sheet was prepared by hot-rolling the slab at a thickness of 2.3 mm.

The hot-rolled sheet was treated using a shot blaster at a steel sheet moving speed of 30 mpm, a rotation speed of 2250 rpm, a particle usage amount of 1500 kg/min, and a particle ball size of 0.6 cm to completely remove a scale layer. Then, the hot-rolled sheet was immersed and pickled for about 120 seconds in a hydrochloric acid solution (concentration of about 16 wt %) at a temperature of about 82° C. Thereafter, washing was performed.

Figure 3:
FIG. 3 is an SEM photograph of a cross section of the steel sheet after pickling in Comparative Example of the present invention.

FIG. 3 illustrates a scanning electron microscope (SEM) photograph of a cross section of the steel sheet after pickling. As illustrated in FIG. 3, it was confirmed that the scale layer was completely removed.

As a result of measuring the surface of the pickled hot-rolled sheet with EPMA, it may be confirmed that the Si content is present in a small amount (general in FIG. 4).

Then, the hot-rolled sheet was cold-rolled to have a sheet thickness of 0.23 mm.

Comparative Example 2—Presence of Large Amount of Scales

A slab containing 3.4 wt % of silicon (Si) and consisting of Fe and other inevitable impurities on the balance was prepared.

A hot-rolled sheet was prepared by hot-rolling the slab at a thickness of 2.3 mm.

The hot-rolled sheet was treated using a shot blaster at a steel sheet moving speed of 30 mpm, a particle usage amount of 500 kg/min, a rotation speed of 2250 rpm, and a particle ball size of 0.6 cm to leave a scale layer at a thickness of about 800 nm. Then, the hot-rolled sheet was immersed and pickled for about 60 seconds in a hydrochloric acid solution (concentration of about 7 wt %) at a temperature of about 65° C. Thereafter, washing was performed.

Then, the hot-rolled sheet was cold-rolled to have a sheet thickness of 0.23 mm.

Experimental Example 2—Comparison According to Addition of Ammonium Fluoride

Example 2—Using 1 Part by Weight of Ammonium Fluoride and Secondary Heating of 1000° C.

A metal oxide layer was formed on the cold-rolled sheet of Example 1 by the following process.

The cold-rolled sheet of Example 1 was subjected to primary recrystallization annealing at a temperature of 850° C. under an $NH_3$ gas atmosphere.

An annealing separator containing magnesium hydroxide and ammonium fluoride was coated on the cold-rolled sheet on which the primary recrystallization annealing was completed. Ammonium fluoride was included in 1 part by weight based on 100 parts by weight of magnesium hydroxide. Water was included in 85 parts by weight based on 100 parts by weight of magnesium hydroxide.

Figure 6:
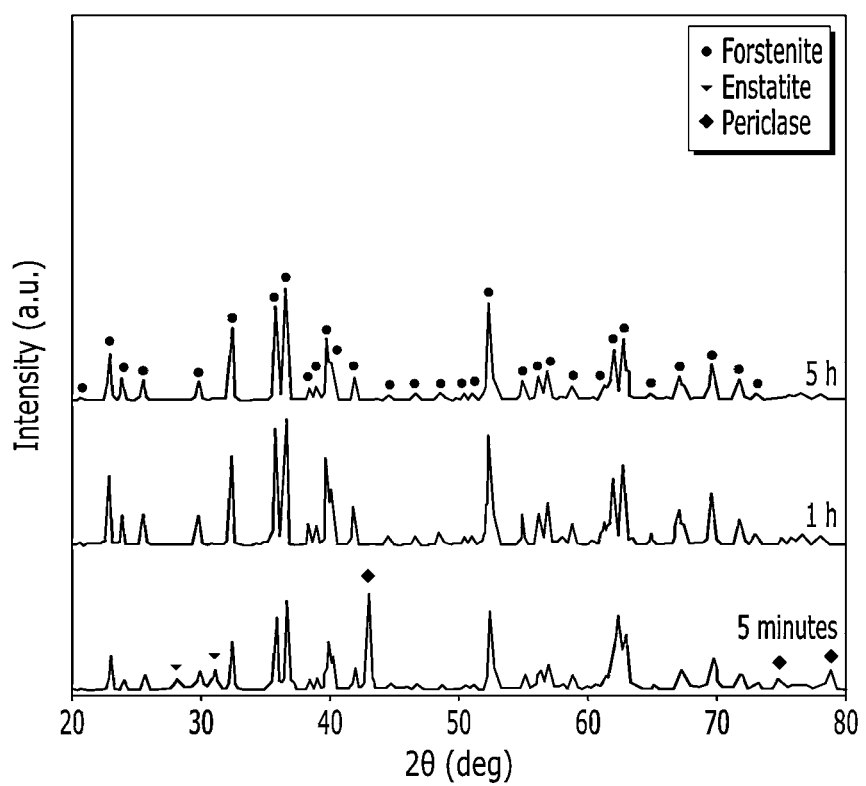
FIG. 6 is an XRD analysis result of a metal oxide layer manufactured in an exemplary embodiment of the present invention.

Thereafter, the cold-rolled sheet coated with the annealing separator was subjected to secondary recrystallization annealing. During the secondary recrystallization annealing, the first heating was performed at a temperature of 650° C. to 850° C. at a heating rate of 15° C./hr, and the second heating was made at a temperature of 850° C. to 1000° C. at a heating rate of 15° C./hr. In addition, the first heating was performed in an atmosphere of 20 vol % of nitrogen and 80 vol % of hydrogen, and after the second heating, the cold-rolled sheet was maintained for 15 hours in a 100 vol % hydrogen atmosphere and then cooled in a furnace to remove impurities. The result of XRD analysis of the formed metal oxide layer was illustrated in FIG. 6.

Example 3—Using 1 Part by Weight of Ammonium Fluoride and Secondary Heating of 1200° C.

Figure 7:
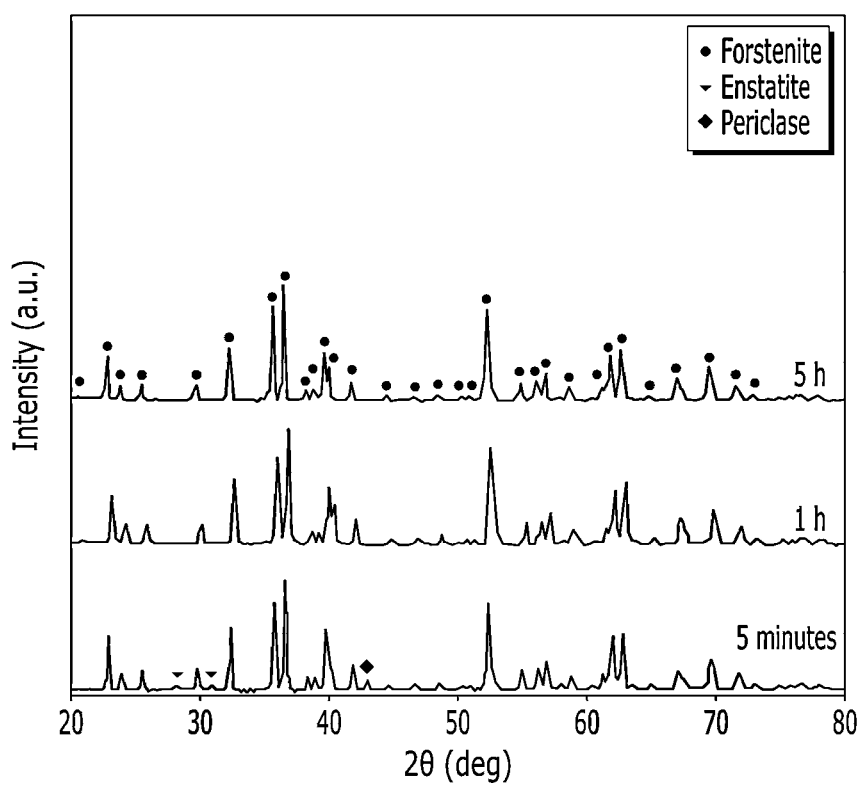
FIG. 7 is an XRD analysis result of a metal oxide layer manufactured in an exemplary embodiment of the present invention.

A metal oxide layer was formed in the same manner as in Example 2, except that 1 part by weight of ammonium fluoride was used based on 100 parts by weight of magnesium oxide and the secondary heating was performed to 1200° C. The result of XRD analysis of the formed metal oxide layer was illustrated in FIG. 7.

Comparative Example 3—Non-Addition of Ammonium Fluoride and Secondary Heating of 1000° C.

Figure 8:
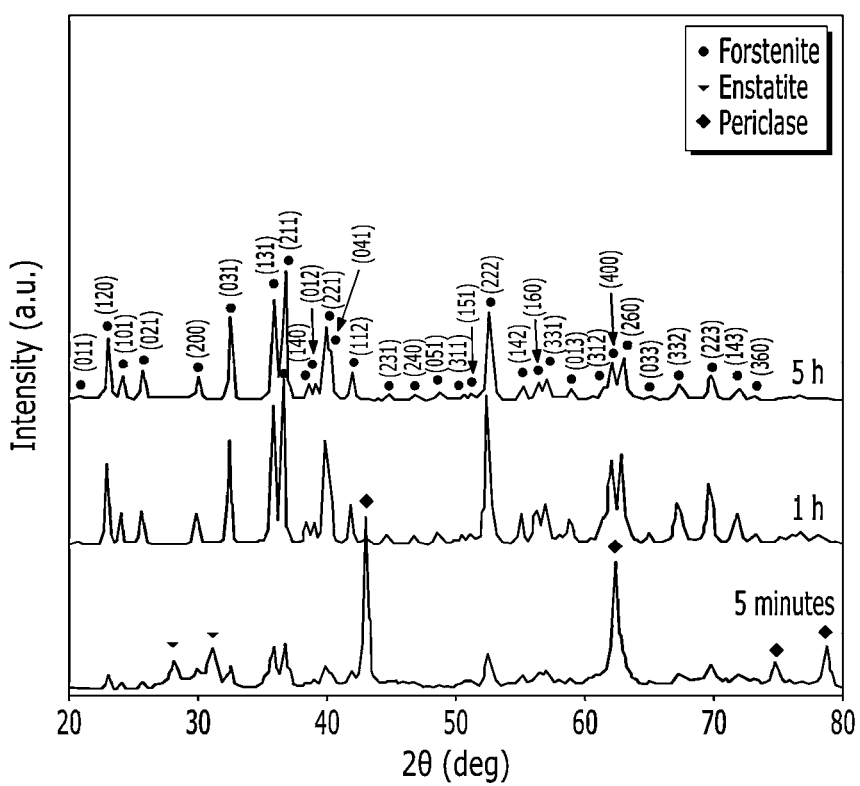
FIG. 8 is an XRD analysis result of a metal oxide layer manufactured in Comparative Example of the present invention.

A metal oxide layer was formed in the same manner as in Example 2, except that an annealing separator did not contain ammonium fluoride. The result of XRD analysis of the formed metal oxide layer was illustrated in FIG. 8.

Comparative Example 4—Non-Addition of Ammonium Fluoride and Secondary Heating of 1200° C.

Figure 9:
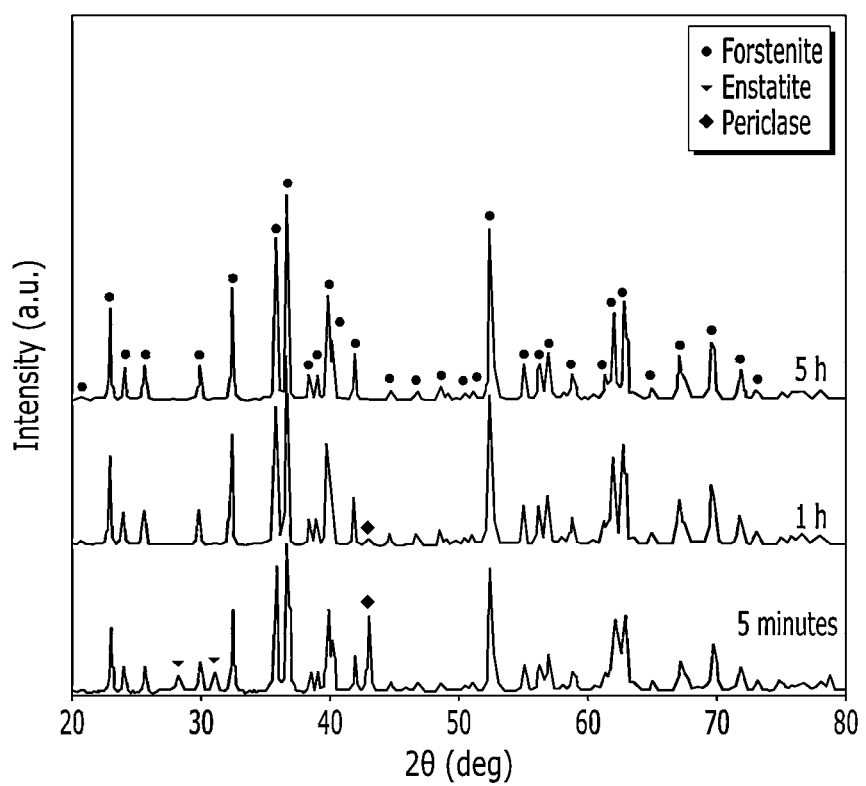
FIG. 9 is an XRD analysis result of a metal oxide layer manufactured in Comparative Example of the present invention.

A metal oxide layer was formed in the same manner as in Example 2, except that an annealing separator did not contain ammonium fluoride and the secondary heating was performed to 1200° C. The result of XRD analysis of the formed metal oxide layer was illustrated in FIG. 9.

The present invention may be manufactured in various different forms, not limited to the above embodiments, and it will be appreciated to those skilled in the present invention that the present invention may be implemented in other specific forms without changing the technical idea or essential features of the present invention. Therefore, it should be appreciated that the aforementioned exemplary embodiments are illustrative in all aspects and are not restricted.

DESCRIPTION OF SYMBOLS

100: Grain-oriented electrical steel sheet
10: Grain-oriented electrical steel sheet substrate
20: Scale layer
30: Metal oxide layer
40: Insulation coating

The invention claimed is:

1. A grain-oriented electrical steel sheet comprising:
   a grain-oriented electrical steel sheet substrate;
   a scale layer positioned on the grain-oriented electrical steel sheet substrate, the scale layer having a thickness of 5 to 100 nm; and
   a metal oxide layer positioned on the scale layer,
   wherein the metal oxide layer includes a forsterite compound, and
   F content of the metal oxide layer is 0.1 to 3 wt %.

2. The grain-oriented electrical steel sheet of claim 1, wherein:
   the metal oxide layer includes a first phase including a forsterite compound and second phase consisting of Si, and
   the first phase is included in more than 5 area % and less than 95 area % with respect to 100 area % of the metal oxide layer, and the second phase is included in more than 3 area % and less than 20 area % with respect to 100 area % of the metal oxide layer.

3. The grain-oriented electrical steel sheet of claim 1, further comprising:
   an insulation coating layer positioned on the metal oxide layer.

4. The grain-oriented electrical steel sheet of claim 1, wherein:
   the metal oxide layer includes magnesium oxide (MgO) of 1.0 wt % or less.

5. The grain-oriented electrical steel sheet of claim 1, wherein:
   the scale layer includes Si of 1 to 80 wt % and O of 1 to 80 wt %, and the balance of Fe and inevitable impurities.

* * * * *